United States Patent
Mishra

(10) Patent No.: US 9,464,610 B2
(45) Date of Patent: Oct. 11, 2016

(54) FUEL INJECTOR HAVING DIFFERENTIAL TIP COOLING SYSTEM AND METHOD

(71) Applicant: General Electric Company, Schenectady, NY (US)

(72) Inventor: Niraj Kumar Mishra, Bangalore (IN)

(73) Assignee: General Electric Company, Schenectady, NY (US)

( * ) Notice: Subject to any disclaimer, the term of this patent is extended or adjusted under 35 U.S.C. 154(b) by 758 days.

(21) Appl. No.: 13/747,391

(22) Filed: Jan. 22, 2013

(65) Prior Publication Data

US 2013/0125859 A1    May 23, 2013

Related U.S. Application Data

(63) Continuation of application No. 12/772,091, filed on Apr. 30, 2010, now Pat. No. 8,360,342.

(51) Int. Cl.
*F02M 53/04* (2006.01)
*F02C 3/28* (2006.01)
*F02M 69/04* (2006.01)

(52) U.S. Cl.
CPC ............. *F02M 53/043* (2013.01); *F02C 3/28* (2013.01); *F02M 69/04* (2013.01); *F05D 2260/20* (2013.01); *Y02E 20/16* (2013.01); *Y02E 20/18* (2013.01)

(58) Field of Classification Search
CPC ........ F23D 14/00; F23D 14/46; F23D 14/72; F23D 14/78; F02M 53/04; F02M 53/043; F02M 69/04; F02C 3/20; F02C 3/26; F02C 3/28; Y02E 20/10; Y02E 20/16; Y02E 20/18; F05D 2260/20
USPC .............................................. 239/132–132.5
See application file for complete search history.

(56) References Cited

U.S. PATENT DOCUMENTS

| | | | |
|---|---|---|---|
| 2,861,900 A * | 11/1958 | Pelton | B05B 7/203 118/302 |
| 3,638,932 A * | 2/1972 | Masella | C21C 5/4606 239/132.3 |
| 3,874,592 A | 4/1975 | Buschmann et al. | |
| 4,417,721 A | 11/1983 | Pehlke et al. | |
| 4,431,607 A * | 2/1984 | Casperson | C09C 1/50 239/132.3 |
| 4,564,143 A * | 1/1986 | Touze | C21B 7/16 122/6.6 |
| 4,736,693 A | 4/1988 | Clomburg, Jr. | |
| 4,836,831 A | 6/1989 | Martens | |
| 4,858,538 A | 8/1989 | Kuypers et al. | |
| 4,878,835 A | 11/1989 | Martens | |
| 4,887,962 A | 12/1989 | Hasenack et al. | |
| 4,888,031 A | 12/1989 | Martens | |
| 5,261,602 A | 11/1993 | Brent et al. | |
| 5,931,978 A | 8/1999 | Oortwijn et al. | |
| 6,276,611 B1 | 8/2001 | Brooker et al. | |
| 6,755,355 B2 | 6/2004 | Whittaker | |
| 6,892,654 B2 | 5/2005 | Whittaker et al. | |
| 8,360,342 B2 * | 1/2013 | Mishra | F02C 3/28 239/132.3 |

FOREIGN PATENT DOCUMENTS

| | | |
|---|---|---|
| EP | 400740 | 12/1990 |
| WO | 9833870 | 8/1998 |

\* cited by examiner

*Primary Examiner* — Christopher Kim
(74) *Attorney, Agent, or Firm* — Fletcher Yoder, P.C.

(57) ABSTRACT

According to various embodiments, a system includes a gasification fuel injector. The gasification fuel injector includes a tip portion, an annular coolant chamber disposed in the tip portion, and a first structural support extending through the annular coolant chamber. The first structural support divides the annular coolant chamber into a first passage and a second passage.

20 Claims, 6 Drawing Sheets

FUEL INJECTOR HAVING DIFFERENTIAL TIP COOLING SYSTEM AND METHOD

CROSS-REFERENCE TO RELATED APPLICATIONS

This application is a continuation of U.S. patent application Ser. No. 12/772,091, entitled "FUEL INJECTOR HAVING DIFFERENTIAL TIP COOLING SYSTEM AND METHOD," filed Apr. 30, 2010, which is herein incorporated by reference in its entirety.

BACKGROUND OF THE INVENTION

The subject matter disclosed herein relates to fuel injectors, and, more particularly, to fuel injectors for gasifiers.

A variety of combustion systems employ fuel injectors to inject a fuel into a combustion chamber. For example, an integrated gasification combined cycle (IGCC) power plant includes a gasifier with one or more fuel injectors. The fuel injectors supply a fuel, such as an organic feedstock, into the gasifier along with oxygen and steam to generate a syngas. In general, combustion occurs downstream from the fuel injectors. However, the proximity of a flame and/or heat from combustion can damage and/or reduce the life of the fuel injectors, particularly if the fuel injectors exceed certain temperatures. For example, the fuel injector may be subject to increasing greater temperatures toward the tip and/or other locations close to the flame. Unfortunately, existing cooling techniques are unable to provide differential cooling of the fuel injector, and thus the hot spots may not be sufficiently cooled to avoid premature wear.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasification fuel injector. The gasification fuel injector includes a tip portion, an annular coolant chamber disposed in the tip portion, and a first structural support extending through the annular coolant chamber. The first structural support divides the annular coolant chamber into a first passage and a second passage.

In a second embodiment, a system includes a fuel injector. The fuel injector includes a fuel passage configured to inject a fuel, a first oxygen passage configured to inject oxygen, an annular coolant chamber that includes an inner annular wall and an outer annular wall, and a first structural support extending through the annular coolant chamber between the inner annular wall and the outer annular wall. The first structural support divides the annular coolant chamber into a first passage and a second passage. The first structural support includes a first flow divider wall that isolates a first coolant flow in the first passage relative to a second coolant flow in the second passage.

In a third embodiment, a system includes a combustion chamber and a fuel injector coupled to the combustion chamber. The fuel injector includes a tip portion, a fuel passage configured to inject a fuel through the tip portion, a first annular coolant passage disclosed in the tip portion, a second annular coolant passage disposed in the tip portion, and a first structural support disposed between the first annular coolant passage and the second annular coolant passage. The fuel injector is configured to provide different coolant flows through the first and second annular coolant passages.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
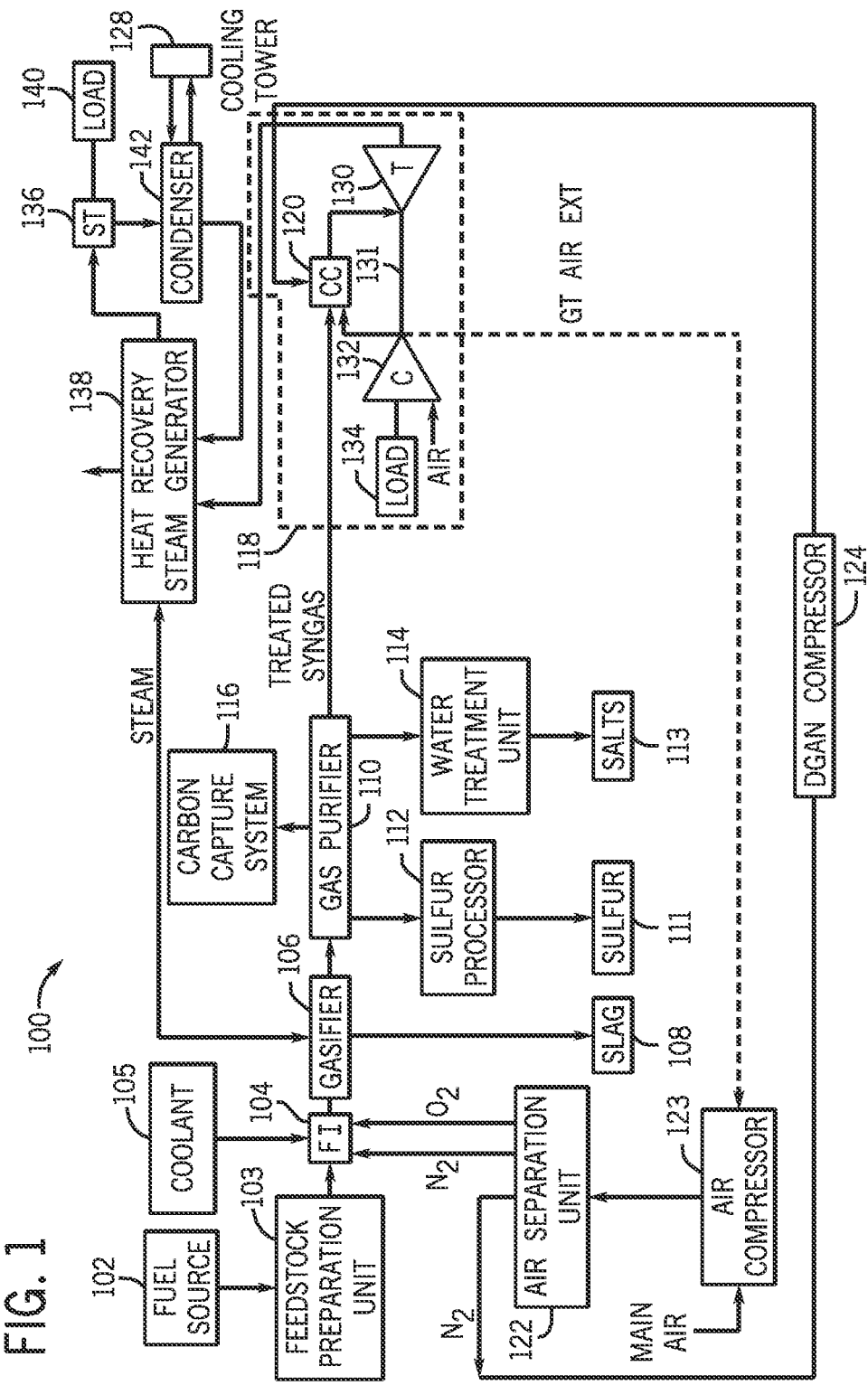
FIG. 1 is a block diagram of an IGCC power plant incorporating a fuel injector according to an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A combustion system may utilize fuel injectors to inject fuel, and optionally other fluids, into a combustion chamber. For example, an IGCC power plant may have a gasifier that includes one or more gasification fuel injectors. Because combustion occurs near a tip of the fuel injector, the tip may be exposed to temperatures up to approximately 1,300 degrees Celsius (C). In addition, hot combustion gases may recirculate back toward the fuel injector. Such high temperatures may cause damage to the fuel injector even though the injector is made from materials specifically designed for high temperatures. Accordingly, different cooling methods may be used to increase the life of fuel injectors. For example, fuel injector tips may have an integral coolant chamber to flow a coolant. In addition, a cooling coil may surround the body of the fuel injector to carry coolant to the coolant chamber. However, when such methods are used without the disclosed cooling techniques, an outer surface of the fuel injector may be exposed to hot recirculated gases, while an inner surface of the fuel injector may be in contact with the coolant. For example, the temperature of the coolant may be approximately 40 degrees C., resulting in a temperature difference of approximately 1,260 degrees C. Such a large temperature gradient may result in cracks near the tip of the fuel injector. Specifically, the high temperatures and temperature fluctuations may cause radial cracks near the tip. In addition, high strain forces caused by the high temperature gradient may cause circumferential cracks. Thicker coolant chamber walls designed for strength may inhibit heat transfer, contributing to large temperature gradients. Such cracks may reduce the life of the fuel injector.

To address these issues, in various embodiments described below, an annular coolant chamber of a gasification fuel injector may be configured with structural supports that divide the coolant chamber into multiple passages. The structural supports may enable the wall thickness of the outer side of the coolant chamber to be reduced such that heat transfer across the outer wall is increased and the probability of cracks decreased. In addition, the fuel injector may be configured to provide different coolant flows through the different passages. The different coolant flows may include different coolants, different flow rates, different coolant temperatures, or any combination thereof. For example, greater coolant flow rates may be directed through the passages closest to the tip, which may experience the highest temperature and strain. In other words, the multiple passages enable differential or preferential cooling of the fuel injector, thereby providing greater cooling in hot spots and lesser cooling in cold spots of the fuel injector.

Turning now to the drawings, FIG. 1 is a diagram of an embodiment of an IGCC system 100 that may produce and burn a synthetic gas, i.e., syngas. As discussed in detail below, the IGCC system 100 may include an embodiment of a gasification fuel injector that includes structural supports extending through an annular coolant chamber, such that the chamber is divided into multiple passages. Other elements of the IGCC system 100 may include a fuel source 102, which may be a solid or a liquid, that may be utilized as a source of energy for the IGCC system. The fuel source 102 may include coal, petroleum coke, oil, biomass, wood-based materials, agricultural wastes, tars, coke oven gas and asphalt, or other carbon containing items.

The fuel of the fuel source 102 may be passed to a feedstock preparation unit 103. The feedstock preparation unit 103 may, for example, resize or reshape the fuel source 102 by chopping, milling, shredding, pulverizing, briquetting, or palletizing the fuel source 102 to generate feedstock. Additionally, water, or other suitable liquids may be added to the fuel source 102 in the feedstock preparation unit 103 to create slurry feedstock. In other embodiments, no liquid is added to the fuel source, thus yielding dry feedstock. In further embodiments, the feedstock preparation unit 103 may be omitted if the fuel source 102 is a liquid.

Next, the feedstock may be passed to a fuel injector 104 coupled to a gasifier 106. As appreciated, the gasifier 106 is one example of a combustion chamber that may use the fuel injector 104 with the structural supports and multiple coolant passages as discussed in detail below. In certain embodiments, the fuel injector 104 combines the various feed streams to the gasifier 106 in such a manner as to promote efficient combustion. In addition, a coolant 105, described in more detail below, may be directed to the fuel injector 104 to provide cooling and extend the life of the fuel injector. Specifically, the gasifier 106 may convert the feedstock into a syngas, e.g., a combination of carbon monoxide and hydrogen. This conversion may be accomplished by subjecting the feedstock to a controlled amount of steam and oxygen at elevated pressures, e.g., from approximately 20 bar to 85 bar, and temperatures, e.g., approximately 700 degrees C. to 1600 degrees C., depending on the type of gasifier 106 utilized. The gasification process may include the feedstock undergoing a pyrolysis process, whereby the feedstock is heated. Temperatures inside the gasifier 106 may range from approximately 150 degrees C. to 700 degrees C. during the pyrolysis process, depending on the fuel source 102 utilized to generate the feedstock. The heating of the feedstock during the pyrolysis process may generate a solid (e.g., char) and residue gases (e.g., carbon monoxide, hydrogen, and nitrogen). The char remaining from the feedstock from the pyrolysis process may only weigh up to approximately 30% of the weight of the original feedstock.

A combustion process may then occur in the gasifier 106. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 700 degrees C. to 1600 degrees C. Next, steam may be introduced into the gasifier 106 during a gasification step. The char may react with the carbon dioxide and steam to produce carbon monoxide and hydrogen at temperatures ranging from approximately 800 degrees C. to 1100 degrees C. In essence, the gasifier utilizes steam and oxygen to allow some of the feedstock to be "burned" to produce carbon monoxide and release energy, which drives a second reaction that converts further feedstock to hydrogen and additional carbon dioxide.

In this way, the gasifier 106 manufactures a resultant gas. This resultant gas may include approximately 85% of carbon monoxide and hydrogen in equal proportions, as well as $CH_4$, HCl, HF, COS, $NH_3$, HCN, and $H_2S$ (based on the sulfur content of the feedstock). This resultant gas may be termed untreated syngas, because it includes, for example, $H_2S$. The gasifier 106 may also generate waste, such as slag 108, which may be a wet ash material. This slag 108 may be removed from the gasifier 106 and disposed of, for example, as road base or as another building material. To clean the untreated syngas, a gas purifier 110 may be utilized. In one embodiment, the gas purifier 110 may be a water gas shift reactor. The gas purifier 110 may scrub the untreated syngas to remove the HCl, HF, COS, HCN, and $H_2S$ from the untreated syngas, which may include separation of sulfur 111 in a sulfur processor 112 by, for example, an acid gas removal process in the sulfur processor 112. Furthermore, the gas purifier 110 may separate salts 113 from the untreated syngas via a water treatment unit 114 that may utilize water purification techniques to generate usable salts 113 from the untreated syngas. Subsequently, the gas from the gas purifier 110 may include treated syngas (e.g., the sulfur 111 has been removed from the syngas), with trace amounts of other chemicals, e.g., $NH_3$ (ammonia) and $CH_4$ (methane).

In some embodiments, a gas processor may be utilized to remove additional residual gas components, such as ammonia and methane, as well as methanol or any residual chemicals from the treated syngas. However, removal of residual gas components from the treated syngas is optional, because the treated syngas may be utilized as a fuel even when it includes the residual gas components, e.g., tail gas. At this point, the treated syngas may include approximately 3% CO, approximately 55% $H_2$, and approximately 40% $CO_2$ and is substantially stripped of $H_2S$.

In some embodiments, a carbon capture system 116 may remove and process the carbonaceous gas (e.g., carbon dioxide that is approximately 80-100 or 90-100 percent pure by volume) included in the syngas. The carbon capture system 116 also may include a compressor, a purifier, a pipeline that supplies $CO_2$ for sequestration or enhanced oil recovery, a $CO_2$ storage tank, or any combination thereof. The captured carbon dioxide may be transferred to a carbon dioxide expander, which decreases the temperature of the carbon dioxide (e.g., approximately 5-100 degrees C., or about 20-30 degrees C.), thus enabling the carbon dioxide to be used as a suitable cooling agent for the system. The cooled carbon dioxide (e.g., approximately 20-40 degrees C., or about 30 degrees C.) may be circulated through the system to meet its refrigeration needs or expanded through subsequent stages for even lower temperatures. Carbon dioxide may also be used as the coolant 105 for the fuel injector 104. The treated syngas, which has undergone the removal of its sulfur containing components and a large fraction of its carbon dioxide, may be then transmitted to a combustor 120, e.g., a combustion chamber, of a gas turbine engine 118 as combustible fuel.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the fuel injector 104. Additionally, the ASU 122 may transmit separated nitrogen to the fuel injector 104 (e.g., as coolant 105) or a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118. The nitrogen may be used as a diluent to facilitate control of emissions, for example.

As described previously, the compressed nitrogen may be transmitted from the DGAN compressor 124 to the combustor 120 of the gas turbine engine 118. The gas turbine engine 118 may include a turbine 130, a drive shaft 131, and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. The drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first 130 and second 140 loads may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Water from the cooling tower 128 may also be used as coolant 105 for the fuel injector 104. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems, such as the IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106 or to the fuel injector 104 as coolant 105. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
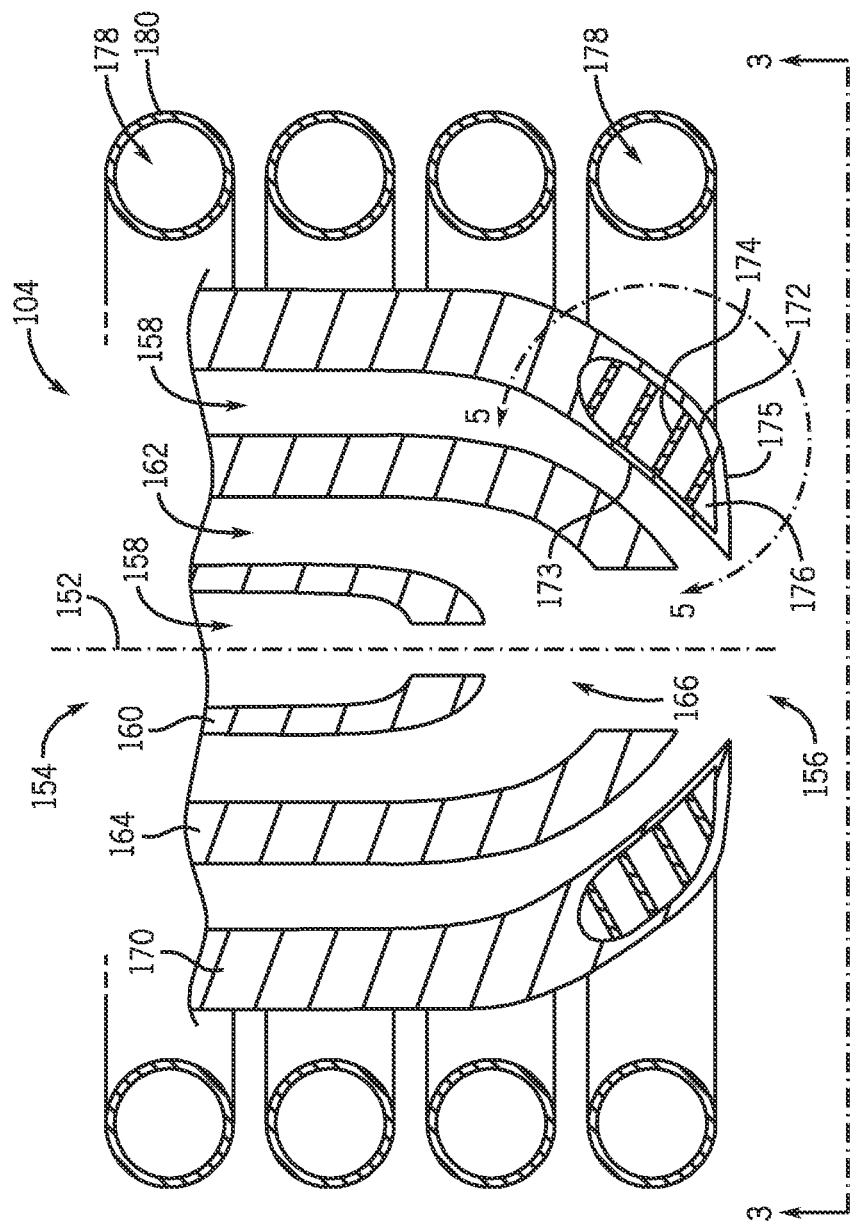
FIG. 2 is an axial cross-section of an embodiment of a fuel injector with a coolant chamber divided into multiple passages.

With the forgoing in mind, FIG. 2 is an axial cross-section of the fuel injector 104 in accordance with an embodiment. An axial axis 152 passes lengthwise through the center of the fuel injector 104. The fuel injector 104 has an upstream side 154, from which the feedstock, oxygen, and other materials may originate. The fuel injector 104 also has a tip 156, where the feedstock, oxygen, and other materials may exit. Thus, the tip 156 is an outlet for the materials. Turning next to the passages of the fuel injector 104, although one arrangement of passages will be described, other arrangements are possible depending on the requirements of a particular combustion system. Specifically, the innermost material passing through the fuel injector 104 is oxygen 158, which is directed to the tip 156 by a first oxygen passage 160. The first oxygen passage 160 supplies oxygen 158 for combustion downstream of the tip 156 of the fuel injector 104. Oxygen 158 may include, but is not limited to, pure oxygen, oxygen mixtures, and air. The next outermost material is a fuel 162, which is directed to the tip 156 by a fuel passage 164. Thus, the fuel passage 164 surrounds the first oxygen passage 160 in a coaxial or concentric arrangement. The fuel 162 may include a dry fuel, a slurry fuel, a liquid fuel, or any combination thereof. The fuel passage 164 directs the fuel 162 just downstream of oxygen 158 from the first oxygen passage 160 to enhance the mixing of the fuel and oxygen. The region where the oxygen 158 from the first oxygen passage 160 and the fuel 162 combine may be referred to as a pre-mix zone 166. The next outermost material is oxygen 158, which is directed to the tip 156 of the fuel injector 104 by a second oxygen passage 170. Thus, the second oxygen passage 170 surrounds the fuel passage 164 in a coaxial or concentric arrangement. The second oxygen passage 170 may direct oxygen 158 to the mixture of the fuel 162 and oxygen from the first oxygen passage 160 to produce a fine spray for efficient combustion. The oxygen 158 from the second oxygen passage 170 may also include, but is not limited to, pure oxygen, oxygen mixtures, and air.

Disposed in the tip 156 of the fuel injector 104 is an annular coolant chamber 172. Although the coolant chamber 172 is shown near the tip of the second oxygen passage 170 in this embodiment, the coolant chamber may extend toward the upstream side 154 or be located wherever coolant is needed in other embodiments. In addition, the cross-section of the coolant chamber 172 may have the particular shape shown in FIG. 2, or be configured in other suitable shapes, such as squares, ovals, triangles, rectangles, or other regular or irregular shapes. Moreover, the coolant chamber 172 includes one or more structural supports 174 that extend crosswise through the coolant chamber, dividing the coolant chamber into two, three, four, five, or more passages 176. In the particular embodiment shown, the structural supports 174 extend between an inner wall 173 facing oxygen 158, and an outer wall 175 facing an interior of the combustion chamber. Thus, the structural supports 174 may act as flow dividers that isolate the passages 176 from one another.

Coolant 178 may enter a cooling coil 180 near the upstream side 154 of the fuel injector 104. The coolant 178 then circulates through the coil 180 until it enters the coolant chamber 172. Examples of coolants 178 include, but are not limited to, water, steam, carbon dioxide, and nitrogen. However, the coolant 178 may include any suitable coolant gas, coolant liquid, coolant mixture, or any combination thereof. As each of these materials has different heat transfer characteristics, a particular coolant 178 may be selected depending on the particular requirements of the fuel injector 104. Furthermore, a different coolant 178 may be independently supplied to each passage 176 in certain embodiments. As the coolant 178 passes through the coolant chamber 172, the coolant may increase in temperature from exposure to hot combustion gases. However, this heat may be removed from the tip 156 as the warm coolant 178 exits the coolant chamber 172. The warm coolant 178 may be passed through a heat exchanger to be cooled and circulated back to the fuel injector 104. A refrigerant or air, for example, may be used for cooling in the heat exchanger. By absorbing the heat from the hot combustion gases and carrying it away from the fuel injector 104, the coolant chamber 172 helps to protect the tip 156 from high temperature damage. In addition, the cooling coil 180 and passages 176 may be fabricated from materials specifically designed for high temperatures, such as, but not limited to, austenitic nickel-chromium-based superalloys and cobalt-chromium-iron heat-resistant alloys.

To illustrate the configuration of the passages and cooling coil 180 described above, FIG. 3 is a front view of the tip 156 of the fuel injector 104 along the line labeled 3-3 in FIG. 2. Correspondingly, the axial cross-section of FIG. 2 is indicated along the line labeled 2-2 in FIG. 3. Elements in common with those shown in FIG. 2 are labeled with the same reference numerals. As illustrated in FIG. 2, the passages 160, 164, and 170 are annular and coaxial with one another, and the cooling coil 180 encircles the passages leading to the coolant chamber 172. In the particular embodiment shown, an entrance 190 of the cooling coil 180 is coupled to the coolant chamber 172 on one side of the second oxygen passage 170 and an exit 192 of the cooling coil 180 is coupled to the opposite side of the coolant chamber 172 on the second oxygen passage 170. The exit 192 of the cooling coil 180 carries the warm coolant 178 away from the fuel injector 104 to be cooled and recirculated back to the fuel injector as described above. The separation distance between each passage may be configured to adjust the flow rate of the material passing through the passage.

Figure 3:
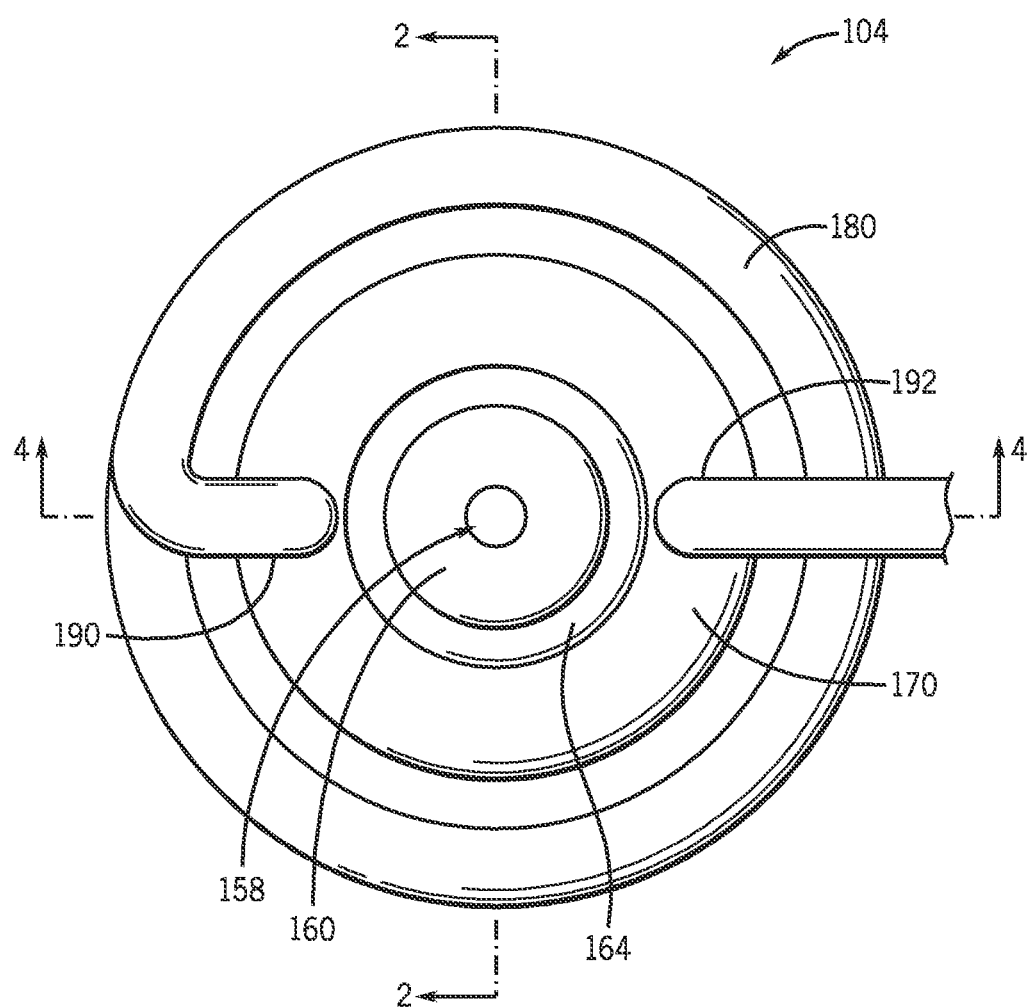
FIG. 3 is a front view of an embodiment of a fuel injector with a coolant chamber divided into multiple passages.
Figure 4:
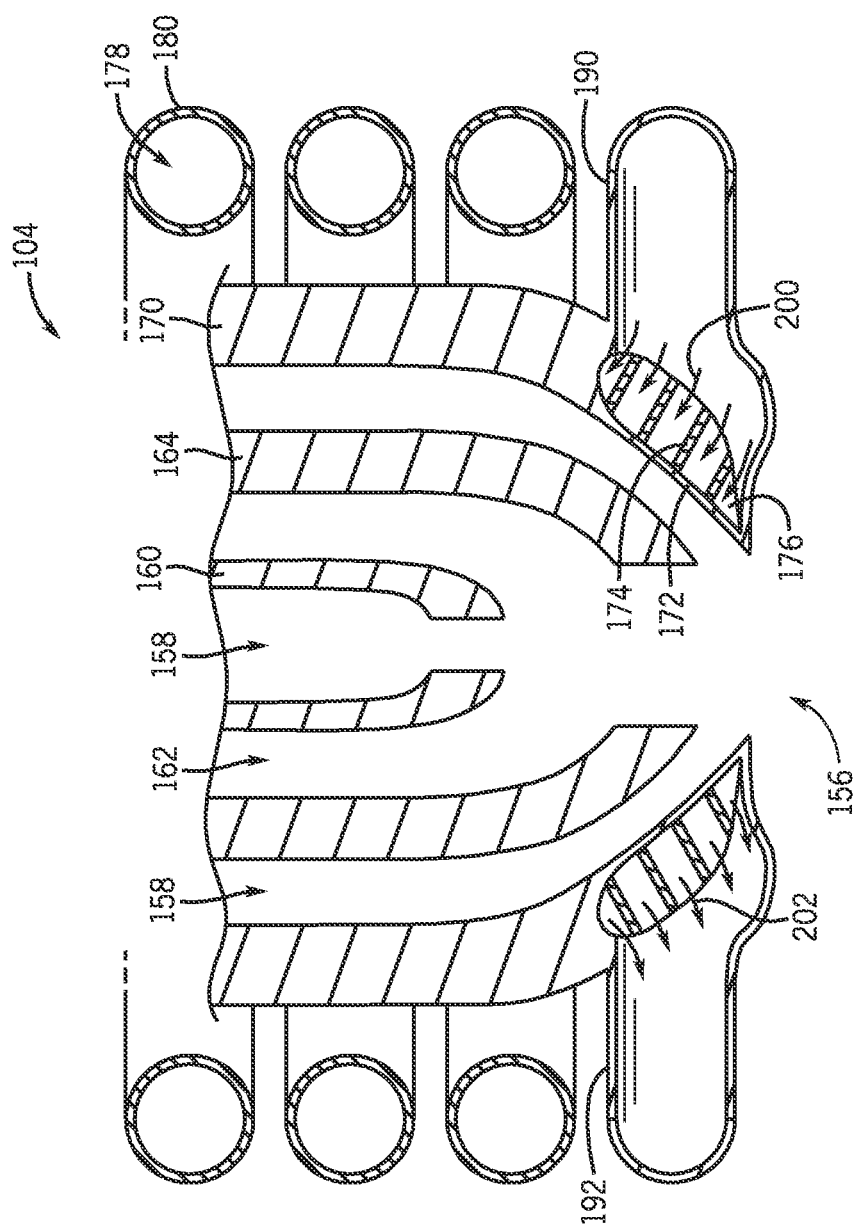
FIG. 4 is an axial cross-section of an embodiment of a fuel injector with a coolant chamber divided into multiple passages, showing the flow of the coolant through the multiple passages.

FIG. 4 is an axial cross-section of the fuel injector 104 along the line labeled 4-4 in FIG. 3, illustrating flow of the coolant 178 through the coolant chamber 172. In the illustrated embodiment, the coolant 178 enters the entrance 190, which is coupled to the second oxygen passage 170. The coolant 178 then divides into multiple coolant entrance paths 200 (e.g., five paths) that flow into each of the passages 176 (e.g., five passages). Each passage 176 is annular and independently flows the coolant 178 through a different portion of the coolant chamber 172, and thus is configured to provide differential cooling of the fuel injector 104 (e.g., tip 156). The coolant 178 then flows out of the passages 176 as indicted by coolant exit paths 202 (e.g., five paths). These multiple exit paths 202 then combine in the exit 192, which is also coupled to the second oxygen passage 170. Each of the passages 176 may differ from one other, which may result in different flow rates through the passages. For example, the passages 176 may have equal or different cross-sectional areas, which may provide passive control (e.g., greater or lesser restriction) of the coolant flow. In certain embodiments, valves and/or independent cooling coils may be coupled to each passage 176 to provide control of the coolant flow. Thus, as will be described below, the configuration of the structural supports 174 and/or the cooling coil 180 may be adjusted to achieve different flow rates in each of the passages 176. Furthermore, some embodiments may provide independent coolant flows, such as different coolants or different coolant temperatures, into the different coolant passages 176.

Figure 5:
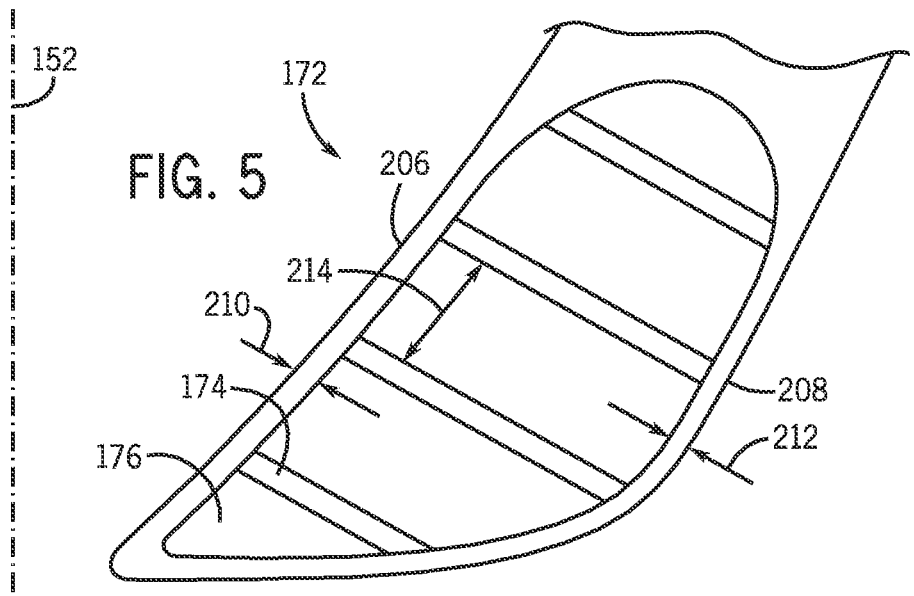
FIG. 5 is an axial cross-section of an embodiment of a coolant chamber divided into multiple passages.

Turning now to the configuration of the structural supports 174, FIG. 5 is an axial cross-section of the coolant chamber 172. The coolant chamber 172 includes an inner wall 206 that may be in contact with oxygen 158 from the second oxygen passage 170. The coolant chamber 172 also has an outer wall 208 that may be in contact with hot combustion gases. Because of the different temperatures of the oxygen 158 and hot combustion gases, the temperature of the inner wall 206 may be less than the temperature of the outer wall 208. The thickness 210 of the inner wall 206 may be between approximately 0.5 to 5 mm, 0.5 to 4 mm, 1 to 3 mm, or 1.5 to 2 mm. Similarly, the thickness 212 of the outer wall 208 may be between approximately 0.5 to 5 mm, 0.5 to 4 mm, 1 to 3 mm, or 1.5 to 2 mm. Inner and outer walls 206 and 208 with thicknesses 210 and 212 may be susceptible to buckling caused by the high temperatures and resulting high strain near the tip 156. However, by adding the structural supports 174, the buckling strength may be increased by a factor of at least approximately 1.5, 2, 2.5, 3, 3.5, 4, or 5 times compared to a coolant chamber 172 without structural supports. In addition, the walls 206 and 208 with thicknesses 210 and 212 may have a smaller temperature gradient across the walls 206 and 208 as compared to walls with greater thicknesses. The reduced wall thicknesses 210 and 212 permitted by the added structural supports 174 improves the heat transfer through the walls 206 and 208 to the coolant 178, thereby decreasing the temperature gradient across the walls 206 and 208. A smaller temperature gradient across the outer wall 208 may contribute to less strain in the outer wall 208, thereby reducing the possibility of circumferential and radial crack formation. Thus, the structural supports 174 may improve the strength of the coolant chamber 172 to allow reduced thicknesses 210 and 212, thereby increasing the life of the fuel injector 104 due to improved cooling. In addition, the adjacent structural supports 174 are separated by a distance 214. In the illustrated embodiment, the separation distance 214 of the structural supports 174 may be approximately the same for all of the adjacent passages 176. Such a uniform separation distance 214 may be easier to fabricate and/or provide the desired flow rates through the passages 176 for a particular fuel injector 104. In certain embodiments, the distance 214 between adjacent structural supports 174 may be selected to provide equal cross-sectional areas of the different passages 176. Furthermore, because the structural supports 174 are oriented at an angle from axis 152, the structural supports 174 may be shaped like conical, annular rings.

Figure 6:
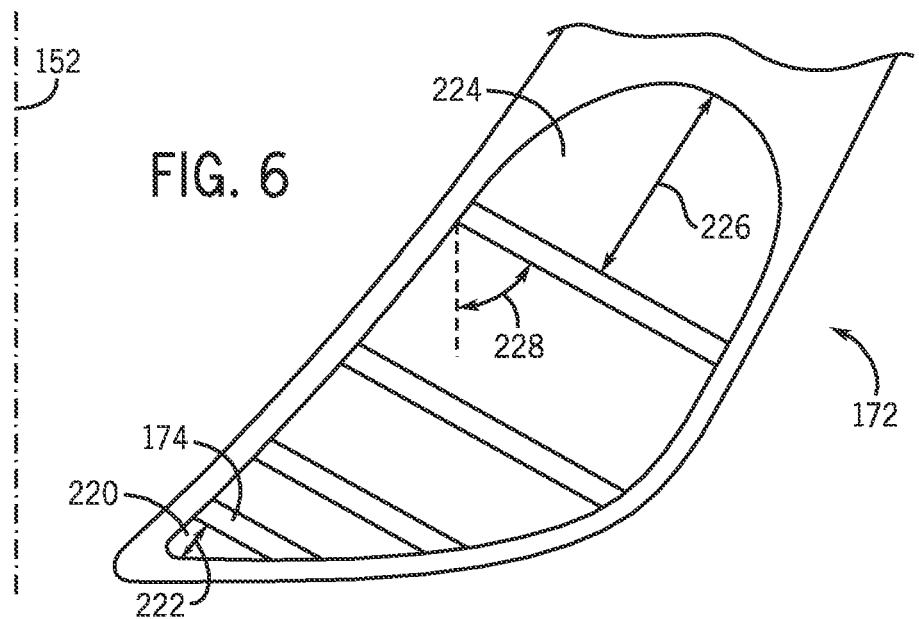
FIG. 6 is an axial cross-section of an embodiment of a coolant chamber divided into multiple passages of unequal separation distance.

In contrast, FIG. 6 shows an embodiment of a coolant chamber 172 with non-uniform separation distances between the structural supports 174. For example, a lower passage 220 may be configured with a smaller separation distance 222 than an upper passage 224 with a larger separation distance 226. Furthermore, the separation distance may gradually increase from the lower passage 220 toward the upper passage 224. A smaller separation distance may result in a smaller cross-sectional area than a larger separation distance. Because hot combustion gases and/or a flame may be more likely to contact the fuel injector 104 near the tip 156, the lower passage 220 may be exposed to higher temperatures than the upper passage 224. Thus, the lower passage 220 may be configured to provide more cooling than the upper passage 224. To achieve this, the lower passage 220 may be configured such that the flow velocity or flow rate of the coolant 178 may be higher than the flow velocity or flow rate of the coolant in the upper passage 224. The smaller cross-sectional area of the lower passage 220 may enable the coolant 178 to flow through the passage faster than through the larger cross-sectional area of the upper passage 224. Other passages in between the first passage 220 and the second passage 224 may be configured with decreasing separation distances and cross-sectional areas such that the flow velocities or flow rates through the passages increase moving toward the tip 156. In this manner, the variably sized passages 176 provide differential cooling of the tip 156. Alternatively, all the passages 176 may be configured with approximately equal cross-sectional areas such that the flow rates through the passages are approximately the same. In addition, the structural supports 174 may be oriented at an angle 228 relative to the axis 152 of the fuel injector 104. The angle 228 may be between approximately 0 to 180 degrees, 0 to 90 degrees, 15 to 75 degrees, 30 to 60 degrees, or 40 to 50 degrees. The angle 228 may be selected based on the structural and/or flow rate requirements of a particular fuel injector 104. As with the embodiment of FIG. 6, because the structural supports 174 are oriented at the angle 228 from the axis 152, the structural supports 174 may be shaped like conical, annular rings.

Figure 7:
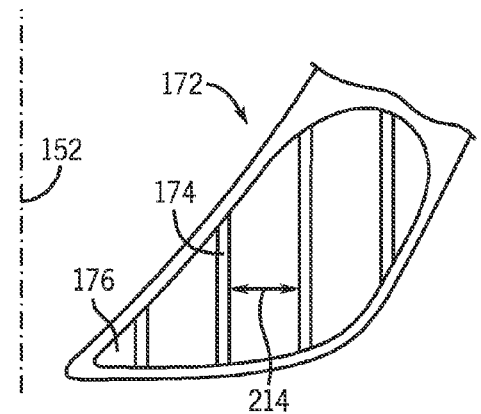
FIG. 7 is an axial cross-section of an embodiment of a fuel injector with a coolant chamber divided into multiple passages that are parallel to a longitudinal axis of the feed injector.

To illustrate another configuration of the coolant chamber 172, FIG. 7 shows an embodiment in which the structural supports 174 are parallel to the axis 152. In other words, the angle 228 may be approximately 0 degrees. In the illustrated embodiment, the separation distance 214 between the structural supports 174 is approximately equal. Alternatively, the separation distance 214 may be non-uniform. In addition, the cross-sectional areas of the passages 176 may be unequal to provide differential cooling. In the illustrated embodiment, the cooling coil 180 may direct the coolant 178 to enter and exit the passages 176 of the coolant chamber 172 in an axial direction. In certain embodiments, the fuel injector 104 may include inlet and outlet tubes extending radially into the chamber 172 to connect with the passages 176. However, any suitable arrangement of the cooling coil 180, inlet flow, and outlet flow may be used with the embodiment of FIG. 7. Furthermore, because the structural supports 174 are parallel to the axis 152, the structural supports 174 may be shaped like coaxial, hollow cylinders.

Figure 8:
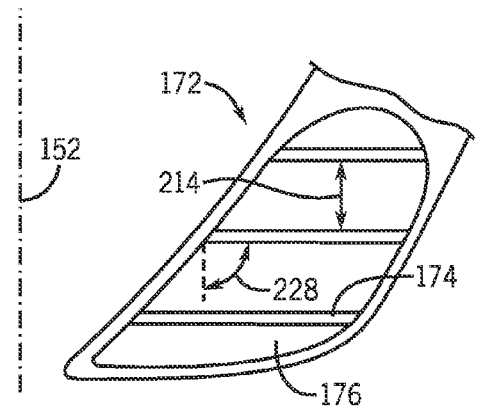
FIG. 8 is an axial cross-section of an embodiment of a fuel injector with a coolant chamber divided into multiple passages that are perpendicular to a longitudinal axis of the feed injector.

In contrast to the orientation of the structural supports 174 in FIG. 7, FIG. 8 shows an embodiment of the coolant chamber 172 in which the structural supports 174 are oriented perpendicular to the axis 152 of the fuel injector 104. In other words, the angle 228 may be approximately 90 degrees. As in FIG. 7, the separation distance 214 between the structural supports 174 is approximately equal. With such a configuration of the structural supports 174, the cooling coil 180 may direct the coolant 178 to enter and exit the coolant chamber 172 in a radial direction from the sides of the fuel injector 104. In addition, structural supports 174 oriented at an angle 228 of approximately 90 degrees may be easier to fabricate because the structural supports may be shaped like flat, annular rings.

Figure 9:
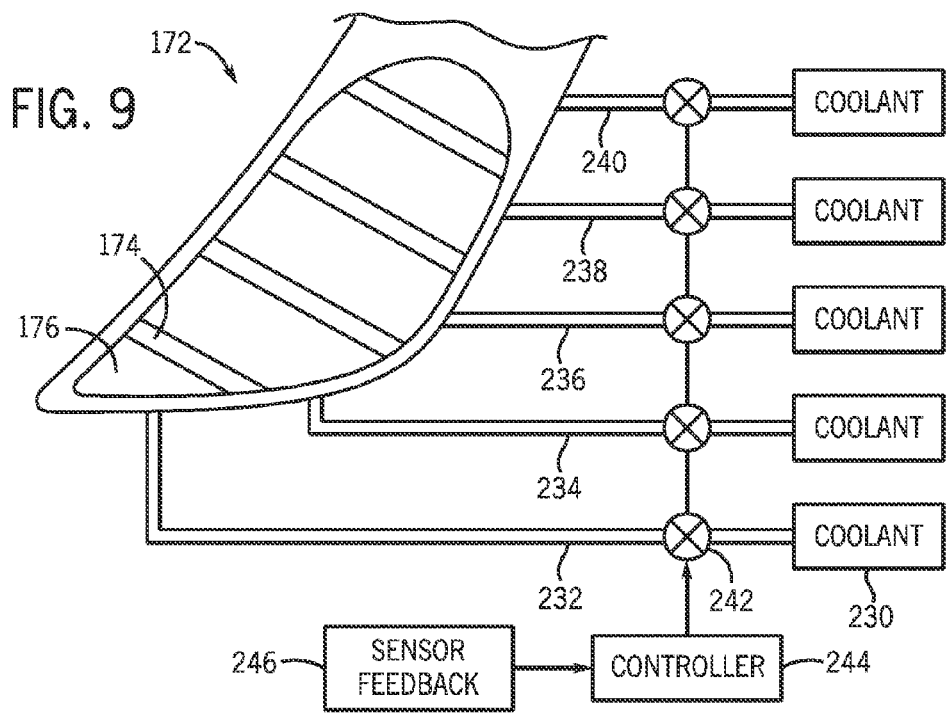
FIG. 9 is a schematic of an embodiment of a fuel injector with a coolant chamber divided into multiple passages in which the flow rate of coolant to each passage is controlled by a controller.

In some embodiments, the flow rates of coolant through the passages 176 are not controlled external to the coolant chamber 172. In other words, the cross-sectional area of the coolant chamber and/or the separation distance 214 between the structural supports 174 may be used to direct more coolant through certain passages than others. In addition, in certain embodiments, a single coolant 178 flows into a single entrance 190 coupled to the coolant chamber 172 and the coolant flow divides in the passages 176. In contrast, FIG. 9 shows an embodiment having independent control of the flow rates of separate coolants 230 into the passages 176. The coolants 230 may be the same or different and/or have the same or different properties. For example, a coolant 230 with better heat transfer characteristics or a cooler coolant 230 may be directed to the passage 176 closest to the tip 156. If the coolants 230 are the same, then the system may include a common source of coolant and a manifold to distribute the coolant among the passages 176. Furthermore, a diameter and/or length of each of the coolant supply lines 232, 234, 236, 238, and 240 may be configured differently to provide a pressure drop that corresponds to a particular flow rate of coolant 230. For example, the diameter of coolant supply line 232 coupled to the passage 176 closest to the tip 156 may be greater than the diameter of coolant supply line 240 coupled to the passage 176 furthest from the tip 156. The larger diameter of coolant supply line 232 compared to coolant supply line 240 may enable a greater flow rate of coolant 230 to the passage 176 closest to the tip 156. The diameters of coolant supply lines 234, 236, and 238 may progressively decrease to provide progressively smaller flow rates of coolant 230 moving away from passages 176 near the tip 156. Similarly, the length of coolant supply line 232 may be shorter than the length of coolant supply line 240, producing a smaller pressure drop and accordingly higher flow rate of coolant 230 to the passage 176 closest to the tip 156. The lengths of coolant supply lines 234, 236, and 238 may progressively increase to provide progressively higher pressure drops and smaller flow rates of coolant 230 moving away from passages 176 near the tip 156.

In addition to the selection of coolants 230 and configuration of coolant supply lines 232, a flow controller 242 may be located on each of the coolant supply lines to adjust the flow rate to each of the passages 176. For example, the flow controller 242 may be a control valve. In certain embodiments, a process controller 244 may be coupled to each of the control valves 242 to control the coolant flow rates at particular setpoints. The process controller 244 may be a programmable logic controller or any other type of controller. In addition, various sensors may be located throughout the fuel injector 104 and gasifier 106 to measure variables, such as, but not limited to, temperature, pressure, and flow rate. The sensor feedback 246 may be sent to the process controller 244. Based on the sensor feedback 246, the process controller 244 may independently adjust the flow rates to the passages 176. For example, if a sensor near the tip 156 indicates an increase in temperature, the process controller 244 may send a signal to increase the flow rate of coolant to the control valve 242 located on the coolant supply line 232 coupled to the passage 176 closest to the tip 154. Thus, by adjusting coolant flow rates in response to conditions in the fuel injector 104 and gasifier 106, the process controller 244 may extend the life of the fuel injector.

A process controller 244 coupled to control valves 242 may not be necessary in all applications. In other embodiments, the flow controller 242 may be a manual valve or restriction orifice. For example, the position of each of the manual valves 242 may be initially adjusted to achieve different flow rates in the passages 176 and then left in that position during operation of the fuel injector 104. The manual valves 242 may also be adjusted during operation of the fuel injector 104 based on sensor feedback 246. Alternatively, restriction orifices may be used as the flow controllers 242. Each of the restriction orifices may be sized to pass a particular coolant flow rate. Once inserted in the coolant supply line 232, each restriction orifice maintains that flow rate. Thus, in certain embodiments, separate flow controllers 242 and/or coolant supply lines 232 may be used to direct more coolant to passages 176 where it may be needed, thereby reducing the possibility of crack formation and prolonging the life of the fuel injector 104.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
 a gasification fuel injector, comprising:
 a tip portion disposed at a fluid exit region of the gasification fuel injector;
 an outermost conduit disposed between a fluid entrance region of the gasification fuel injector and the tip portion;
 an annular coolant chamber disposed in the outermost conduit at the tip portion and between an annular inner wall of the outermost conduit and an annular outer wall of the outermost conduit, wherein the annular coolant chamber comprises a coolant entrance coupled to the annular coolant chamber and a coolant exit coupled to the annular coolant chamber;
 at least one coolant line coupled to the coolant entrance; and
 a first annular structural support extending through the annular coolant chamber between the annular inner wall and the annular outer wall, wherein the first annular structural support divides the annular coolant chamber into a first passage and a second passage, the coolant entrance comprises a first inlet configured to convey the coolant into the first passage and a second inlet configured to convey the coolant into the second passage, the first and second passages are configured to convey the coolant from the first and second inlets, respectively, to the coolant exit in a circumferential direction through the annular coolant chamber, and the first inlet is coupled to a first coolant source, the second inlet is coupled to a second coolant source, and the first and second coolant sources are different from one another.

2. The system of claim 1, wherein the first annular structural support comprises a first flow divider wall that isolates a flow of coolant through the first and second passages relative to one another.

3. The system of claim 1, wherein the first passage has a smaller axial cross-sectional area than the second passage.

4. The system of claim 1, wherein the first passage is configured to flow a first coolant with a greater flow velocity than a second coolant flowing in the second passage.

5. The system of claim 1, comprising a second annular structural support extending through the annular coolant chamber, wherein the first and second annular structural supports collectively divide the annular coolant chamber into the first passage, the second passage, and a third passage.

6. The system of claim 1, comprising a gasifier having the gasification fuel injector.

7. A system, comprising:
a chamber configured to react a fuel with an oxidant;
a fuel injector coupled to the combustion chamber, wherein the fuel injector comprises:
a tip portion;
a fuel passage configured to inject the fuel through the tip portion;
a first annular coolant passage disposed in the tip portion and configured to receive a first coolant flow from a first inlet;
a second annular coolant passage disposed in the tip portion and configured to receive a second coolant flow from a second inlet; and
a first structural support that divides the first annular coolant passage from the second annular coolant passage ; and
at least one coolant line coupled to at least one of the first inlet, or the second inlet, or any combination thereof, wherein the at least one coolant line comprises a first coolant supply line coupled to the first inlet and a second coolant supply line coupled to the second inlet, and comprising a first valve coupled to the first coolant supply line, a second valve coupled to the second coolant supply line, and a controller coupled to the first and second valves, wherein the controller is configured to independently control the first and second valves to provide the first and second coolant flows through the first and second annular coolant passages, respectively.

8. The system of claim 7, wherein the first and second coolant flows comprise different coolant flow rates, different coolant flow velocities, different coolants, different coolant temperatures, or a combination thereof.

9. A system, comprising:
a gasification fuel injector, comprising:
a tip portion disposed at a fluid exit region of the gasification fuel injector;
an outermost conduit disposed between a fluid entrance region of the gasification fuel injector and the tip portion;
an annular coolant chamber disposed in the outermost conduit at the tip portion and between an annular inner wall of the outermost conduit and an annular outer wall of the outermost conduit, wherein the annular coolant chamber comprises a coolant entrance coupled to the annular coolant chamber and a coolant exit coupled to the annular coolant chamber;
at least one coolant line coupled to the coolant entrance; and
a first annular structural support extending through the annular coolant chamber between the annular inner wall and the annular outer wall, wherein the first annular structural support divides the annular coolant chamber into a first passage and a second passage, the coolant entrance comprises a first inlet configured to convey the coolant into the first passage and a second inlet configured to convey the coolant into the second passage, the first and second passages are configured to convey the coolant from the first and second inlets, respectively, to the coolant exit in a circumferential direction through the annular coolant chamber, and wherein the at least one coolant line comprises a first coolant supply line coupled to the first inlet and a second coolant supply line coupled to the second inlet, and comprising a first flow controller coupled to the first coolant supply line and a second flow controller coupled to the second coolant supply line, wherein the first and second flow controllers are configured to independently control coolant flow through the first and second passages.

10. The system of claim 9, comprising a cooling coil disposed surrounding the outermost conduit, wherein the cooling coil is coupled to the first and second inlets.

11. The system of claim 9, wherein the first annular structural support comprises an annular ring.

12. The system of claim 9, comprising a second annular structural support disposed in the annular coolant chamber between the annular inner wall and the annular outer wall, wherein the first and second annular structural supports collectively divide the annular coolant chamber into the first passage, the second passage, and a third passage.

13. The system of claim 12, comprising a third annular structural support disposed in the annular coolant chamber between the annular inner wall and the annular outer wall, wherein the first, second, and third annular structural supports collectively divide the annular coolant chamber into the first passage, the second passage, the third passage, and a fourth passage.

14. The system of claim 9, wherein the first passage has a smaller axial cross-sectional area than the second passage.

15. A system, comprising:
a gasification fuel injector, comprising:
a tip portion disposed at a fluid exit region of the gasification fuel injector;
an outermost conduit disposed between a fluid entrance region of the gasification fuel injector and the tip portion;
an annular coolant chamber disposed in the outermost conduit at the tip portion and between an annular inner wall of the outermost conduit and an annular outer wall of the outermost conduit, wherein the annular coolant chamber comprises a coolant entrance coupled to the annular coolant chamber and a coolant exit coupled to the annular coolant chamber;
at least one coolant line coupled to the coolant entrance; and
a first annular structural support extending through the annular coolant chamber between the annular inner wall and the annular outer wall, wherein the first annular structural support divides the annular coolant chamber into a first passage and a second passage, the coolant entrance comprises a first inlet configured to convey the coolant into the first passage and a second inlet configured to convey the coolant into the second passage, and the first and second passages are configured to convey the coolant from the first and second inlets, respectively, to the coolant exit in a circumferential direction through the annular coolant chamber, and the first annular structural support is oriented at a first angle relative to a central flow axis of the fuel injector, wherein the first angle is between approximately 20 degrees and approximately 70 degrees.

16. The system of claim 15, comprising a second annular structural support disposed in the annular coolant chamber between the annular inner wall and the annular outer wall, wherein the first and second annular structural supports collectively divide the annular coolant chamber into the first passage, the second passage, and a third passage.

17. The system of claim 16, wherein the second annular structural support is oriented at a second angle relative to the central flow axis of the fuel injector, wherein the second angle is between approximately 20 degrees and approximately 70 degrees.

18. The system of claim 16, comprising a third annular structural support disposed in the annular coolant chamber between the annular inner wall and the annular outer wall, wherein the first, second, and third annular structural supports collectively divide the annular coolant chamber into the first passage, the second passage, the third passage, and a fourth passage.

19. The system of claim 18, wherein the second annular structural support is oriented at a second angle relative to the central flow axis of the fuel injector and the third annular structural support is oriented at a third angle relative to the central flow axis of the fuel injector, and wherein the second angle and the third angle are between approximately 20 degrees and approximately 70 degrees.

20. The system of claim 15, wherein the first passage has a smaller axial cross-sectional area than the second passage.

* * * * *